Dec. 17, 1963
R. H. GOODWIN
3,114,869
SERVO MOTOR SPEED CONTROL SYSTEM
Filed Sept. 30, 1960
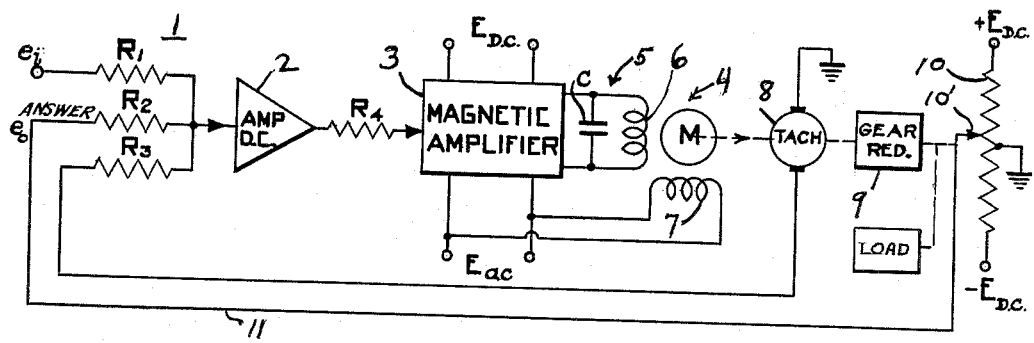
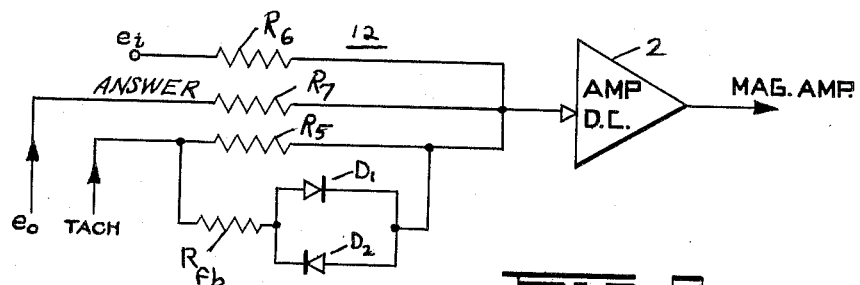
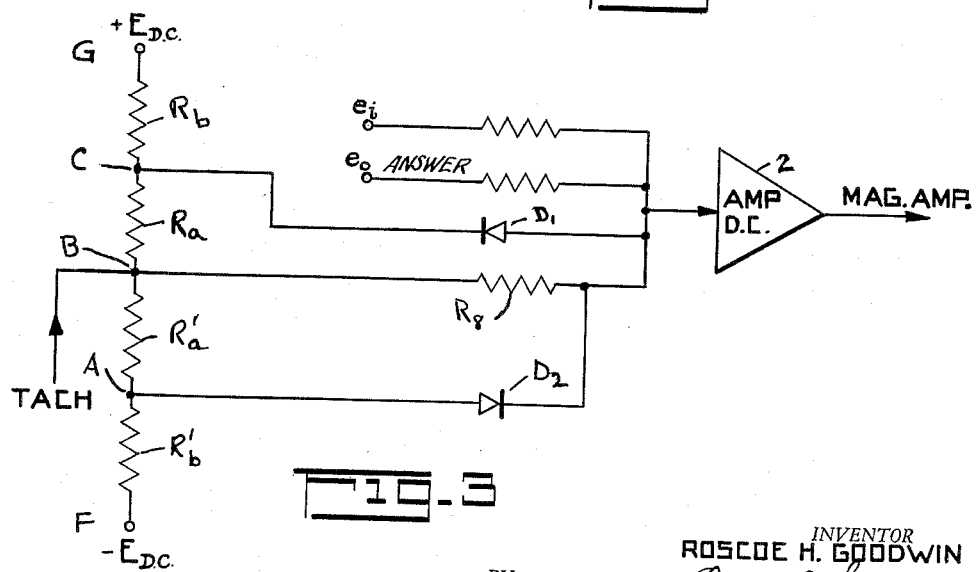
INVENTOR
ROSCOE H. GOODWIN
BY
Orin R Severn
HIS ATTORNEY

United States Patent Office 3,114,869
Patented Dec. 17, 1963

3,114,869
SERVO MOTOR SPEED CONTROL SYSTEM
Roscoe H. Goodwin, Allendale, N.J., assignor to Curtiss-Wright Corporation, a corporation of Delaware
Filed Sept. 30, 1960, Ser. No. 59,578
3 Claims. (Cl. 318—28)

This invention relates to speed control of servo motors, in particular to servo motors that must operate at constant r.p.m. within a speed range materially lower then the rated maximum speed. Position servos using a motor having a comparatively high rated-maximum-speed, such as 12,000 r.p.m., are often required in analog computers for example, to operate at constant speeds as low as a few r.p.m. The usual practice in such cases is to provide a special gear reduction train of high ratio such as 2000:1. In the present instance, this would provide a constant output shaft speed of 6 r.p.m. Where a material change in the desired constant speed is desired, it may be necessary to change the gear box to one of different ratio. This can be both time-consuming and costly. Such high-ratio gear reductions are undesirable due to the high cost of precision gearing for obtaining uniform shaft output without back-lash, high friction losses, etc.

If in the above case a standard 200:1 ratio gear box were used instead, the output speed would be 60 r.p.m., which is too high for many applications. In fact, some applications require an output speed of from 1 to 0.1 r.p.m., and in special cases even lower speeds may be required.

It is therefore a principal object of this invention to provide an improved speed control system for servo motors of the above character that eliminates the need for special or comparatively high-ratio reduction gearing.

Another object is an improved speed control system that is effective to control the servo motor at constant speeds materially below its rated maximum speed notwithstanding motor-supply and mechanical load variations.

Another object is an improved and flexible electronic control system of the above-described character wherein the servo motor is energized through a readily adjustable non-linear generator-feedback network for materially increasing the feedback conductance when the velocity feedback voltage level exceeds a predetermined value, so as to hold constant the motor speed during the positioning operation. Another and more specific object is to provide for adjustment of the input network of the servo system to obtain different desired constant motor speeds by varying the biasing of diodes connected in said network, so as to obviate changing of gear boxes.

By way of example, the present invention used with a standard D.C. servo motor of the 12,000 r.p.m. type commonly used in analog-computers for flight simulators, is effective to limit the motor speed to a constant value as low as 200 r.p.m. Assuming that a standard gear box with 200:1 ratio is connected to the motor, the output shaft speed is reduced to 1 r.p.m. This represents less costly and simplified mechanical equipment, greater flexibility and improved operating characteristics.

The invention will be more fully set forth in the following description referring to the accompanying drawings, and the features of novelty will be pointed out with particularity in the claims annexed to and forming a part of this specification.

FIG. 1 by way of example illustrates diagrammatically a standard D.C. servo motor system with tachometer feedback, that is adaptable for use with the present invention;

FIG. 2 illustrates diagrammatically the input network that is used in FIG. 1 for obtaining the lowest limiting output speed of the servo motor.

FIG. 3 similarly illustrates the input network for obtaining higher output speeds of the servo motor.

Referring to FIG. 1, there is disclosed a position servo combination of the D.C. type. This form of position servo comprises a D.C. network 1 that is connected to the input side of a D.C. amplifier 2. The amplifier which may be of conventional type is illustrated in block form and has the usual circuitry for providing gain and frequency response to match the characteristics of the magnetic amplifier 3 that is connected to the amplifier output and the two-phase A.C. motor 4 that is energized from the mag-amp 3. The mag-amp which may be of conventional design energizes the motor control circuit 5 that includes the motor control winding 6 and a condenser C connected across the motor winding as in usual practice. The other winding 7 of the motor is energized from a suitable source of A.C. reference voltage, such as a 400 cycle source that likewise energizes the mag-amp. A suitable source of D.C. voltage is also supplied to the mag-amp as in practice. The two-phase motor operates in well-known manner, the reference coil voltage being dephased 90° with respect to the control coil voltage so that when the control coil voltage reverses in sense the direction of rotation of the motor is reversed.

For the purpose of providing a velocity feedback voltage for the input network 1, the motor drives a D.C. tachometer 8, the output of which is connected to the network resistor $R_3$. Reversal of rotation of the tachometer causes reversal in sense of the D.C. feedback signal so that this signal is always opposite in sense to the main input D.C. signal at the network resistance $R_1$.

The motor likewise drives through a gear reduction train 9 and indicated load the slider 10' of a position potentiometer 10 that is grounded at its center tap and energized at opposite terminals by a D.C. voltage of opposite polarities. The derived position or "answer" signal at slider 10' is fed by lead 11 to the input network at resistance $R_2$. The resistances $R_1$, $R_2$ and $R_3$ are proportioning resistances of comparatively high value.

This general type position servo is well known and a brief description of its operation will be sufficient for the purposes of this specification. It will be assumed that the position servo is at rest at some position wherein the main input and position signals are equal and balance each other so that there is no output from the amplifier 2. When the main input signal at network resistance $R_1$ changes in value, the network is unbalanced so that the motor starts to rotate in response to the difference signal, as determined by the new signal at $R_1$ and the position signal at $R_2$. Since the amplifier 2 is now energized, its output energizes the mag-amp 3 and in turn the motor control winding 6 so as to cause rotation of the motor in a direction corresponding to the sense of the main input signal. As soon as the motor starts rotation, it causes the tachometer 8 to generate a velocity feedback signal, the sense of which also is dependent on direction of rotation. This signal is small for low rotation speeds but builds up in proportion to motor speed so as to oppose the main signal and thereby control the speed of the motor in well-known manner. At the same time the slider 10' is moved through the gear box 9 in a direction depending on the rotation of the motor, so as to derive either a positive or negative position signal that opposes in sense the main input signal. Thus when the derived position signal closely approaches the magnitude of the main signal and becomes equal to it the motor 4 slows down and stops. This represents the new position corresponding to the input signal at $R_1$.

In this type of circuit the gear box 9 is designed for a motor having a rated maximum speed of approximately 12,000 r.p.m. At such speed the gear reduction ratio must be comparatively high as previously pointed out in order to reduce the speed of the output gear shaft to a low value such as a few r.p.m.

FIG. 2 illustrates a modification of the input network whereby comparatively low constant speed operation of the servo may be obtained throughout its positioning cycle with corresponding reduction in the ratio of the reduction gearing. By means of the circuitry shown the position servo may be operated as low as 200 r.p.m. so that a standard gear box of 200:1 may be used to obtain shaft output speed of but one r.p.m. As illustrated, two opopsitely connected diodes $D_1$ and $D_2$ are connected in parallel relation across the velocity feedback resistor $R_5$ of the input network 12. The network is connected to the input of the D.C. operational amplifier 2 as in the case of FIG. 1, the output of the amplifier arranged to energize a mag-amp, servo motor, etc. as in the case of FIG. 1. The constant output speed of the motor depends on the characteristics of the diodes used. In the present instance, cited for example, the forward breakdown voltage of the diodes (which may be of the silicon type) is approximately one half volt. The limited lowest output motor speed will be about 200 r.p.m. based upon the tachometer constant of two volts D.C. per 1,000 r.p.m. When a sufficiently large D.C. input signal is applied, the motor will run up to the limited speed of 200 r.p.m., at which time the tachometer generates approximately one half volt. The diodes will then start conducting and so short out the velocity feedback resistor $R_5$. With this resistor shorted, the feedback is greatly increased to hold the motor speed down to its reduced constant value at approximately 200 r.p.m. A resistor $R_{fb}$ having a much lower value then the network proportioning resistance $R_5$ is connected in series with the diodes as shown for the purpose of controlling velocity loop gain and ensuring stability without causing any substantial increase in speed.

In operation, it will be seen that either one diode or the other is adapted to short the resistance $R_5$, depending on the sense of the tachometer feedback signal. As in the case of FIG. 1 the main signal is connected to a resistance $R_6$ in the network, and the potentiometer position or "answer" signal is connected to a resistance $R_7$ in the network branch ANS so that in other respects the network functions substantially as in FIG. 1.

FIG. 3 shows a modified form of the network for higher constant speed operation of the servo under the control of an additional control voltage. This additional voltage may be variable if desired to represent some condition that would determine the constant speed of the motor. As shown, a voltage biasing scheme is used comprising four separate resistances $R_a$ and $R_b$, and $R_a'$ and $R_b'$. Considering resistances $R_a$ and $R_b$, the values thereof depend upon the motor output speed desired. The bias voltage determines the output speed, whereas the series resistance $R_a$ determines the slope, i.e., the higher the resistance of $R_a$ the greater the slope.

Assuming that S represents limited output speed desired, the values of $R_a$ and $R_b$ are determined as follows: the series resistances $R_a$, $R_b$, etc. are supplied with the aforesaid additional control voltage of opposite polarity, for example 50 voltage D.C. Considering the speed S, the voltage at point B (representing the connection to the tachometer) is either $$+\frac{2S}{1000} \text{ volts}$$

or $$-\frac{2S}{1000} \text{ volts}$$

the tachometer constant being two volts per 1000 r.p.m. At diode breakdown voltage of approximately one half volt, Diode $D_1$ will conduct when the voltage at point C (to which diode $D_1$ is connected) is about $-\frac{1}{2}$ volt and the diode $D_2$ will conduct when the voltage at point A (to which diode 2 is connected to shunt resistance $R_a$) is about $+\frac{1}{2}$ volt. If the voltage at point B is positive, the diode $D_2$ conducts, and if the voltage at point B is negative the diode $D_1$ conducts. When the diode $D_2$ conducts, the current through it is very small. Thus, diode $D_2$ does not cause any appreciable loading effect on the resistance forming the voltage divider.

The following relation therefore obtains:

$$\frac{\text{Voltage between } B \text{ and } A}{\text{Voltage between } B \text{ and } F} = \frac{R_a}{R_a + R_b}$$

or $$\frac{\frac{2S}{1000} - 0.4}{50 + \frac{2S}{1000}} = \frac{R_a}{R_a + R_b} \qquad \text{Equation 1}$$

Assuming now that the power dissipation is to be limited to W watts; therefore $$\frac{\left(50 + \frac{2S}{1000}\right)^2}{R_a + R_b} = W \qquad \text{Equation 2}$$

From Equations 1 and 2, and the known desired speed S, the values of $R_a$ and $R_b$ can be determined. Assuming that forward and reverse speeds are to be equal, the values of $R_a'$ and $R_b'$ correspond to $R_a$ and $R_b$. It will therefore be seen that, if desired, forward and reverse speeds may differ.

The same reasoning as given above applies when the voltage at point B becomes negative and the diode $D_1$ conducts, as Equations 1 and 2 still hold. When the diode $D_1$ breaks down and conducts, resistance $R_a$ becomes the series resistor (similar to the resistance $R_{fb}$ in FIG. 2). In this case $R_a$ being comparable in value with $R_{fb}$ and much smaller than the high value of the input resistance, the tachometer feedback output is not affected.

As in the case of FIG. 2, the diodes $D_1$ and $D_2$ are oppositely connected so that forward or reverse speed of the motor may be obtained, depending on the sense of the tachometer feedback signal.

The other branches of the network for the main input and position signals are similar to those in FIGS. 1 and 2 and function in similar manner.

As above pointed out, the additional control voltage on the voltage divider $R_a$, etc., may if desired be variable to represent a load condition that would determine the selected constant speed of the servo motor. For example, let it be assumed that the operation of the servo motor is to simulate the raising and lowering of wing flaps in a flight simulator. In such case, the flaps' movement could be simulated to reflect the influence of high or low hydraulic pressure for operating the flaps, the dynamic pressure on the flaps caused by airspeed, etc. The control signal would vary according to such operating conditions and the servo speed would respond accordingly.

It will therefore be seen that by simple resistance changes and the use of biased diodes or the like in the input network chosen speeds can easily be varied within the indicated range in case modifications are desired. Also it will be apparent that more sophisticated speed control schemes are possible by variations of the circuitry embodying the present invention. For example the bias values for the diodes $D_1$ and $D_2$ in FIG. 3 can be made different to give different speeds for clockwise or counter-clockwise rotation; also the bias voltage could be derived from other sources than the reference supply, namely from an amplifier output, so as to make the type motor speed variable as a function of some computed variable and the like.

What I claim is:

1. A speed control system for a D.C. position servo combination having a motor, an amplifier for the motor input, means for producing a D.C. velocity feedback signal representing the speed of said motor and means for producing a position signal opposite in sense to a main input control signal, comprising a network connected to the amplifier input and energized by the aforesaid feedback, position and main input signals, means for applying an additional control signal for energizing a portion of said network, and signal-sensitive switching means connected in said network, said switching means being controlled in accordance with the relative magnitudes of said additional control signal and said feedback signal for determining the impedance of said network so as to cause the motor to run in joint response to said signals at a reduced constant speed that is materially less than the rated maximum speed of the motor throughout its positioning operation.

2. A speed control system for a D.C. position servo combination having a motor, an amplifier for the motor input, means for producing a D.C. velocity feedback signal representing the speed of said motor and means for producing a position signal opposite in sense to a main input control signal, comprising a resistance network connected to the amplifier input and energized by the aforesaid feedback, position and main input signals, means for applying an additional control signal to a portion of said network and a biased diode connected in each of two branches of said network, said diodes being oppositely connected and biased according to the relative magnitudes of said additional signal and said feedback signal for controlling the conductance of said network with respect to main signals of opposite sense, biasing of a respective diode to conductance jointly in response to the aforesaid additional signal and velocity feed-back signal representing a predetermined motor speed causing the motor to run at a reduced constant speed throughout its positioning operation.

3. A servo control system as specified in claim 1 wherein the motor has a high-speed rating, having a speed reducer interconnecting the motor output shaft and the motor load, said reducer having a reduction ratio that is low compared with that of a reducer required at the maximum rated speed.

References Cited in the file of this patent

UNITED STATES PATENTS

| 2,455,364 | Hays | Dec. 7, 1948 |
| 2,913,654 | Clark | Nov. 17, 1959 |
| 3,015,767 | Taylor | Jan. 2, 1962 |

OTHER REFERENCES

Ahrent, W. R.: Servomechanism Practice, page 120, FIG. 8–5; McGraw-Hill, New York, 1954.